United States Patent [19]

Hostetter

[11] Patent Number: 4,908,979

[45] Date of Patent: Mar. 20, 1990

[54] INSECT CONTROL ASSEMBLY FOR USE ON STREETLIGHTS

[76] Inventor: Sherman E. Hostetter, 122 Blackhawk Rd., Beaver Falls, Pa. 15010

[21] Appl. No.: 365,471

[22] Filed: Jun. 13, 1989

[51] Int. Cl.⁴ .............................................. A01M 1/22
[52] U.S. Cl. ...................................................... 43/112
[58] Field of Search ............................................ 43/112

[56] References Cited

U.S. PATENT DOCUMENTS

| | | | |
|---|---|---|---|
| Re. 18,294 | 12/1931 | Frost | 43/112 |
| 2,092,136 | 9/1937 | Plm et al. | 43/112 |
| 2,132,371 | 10/1938 | Kriwat et al. | 43/112 |
| 3,319,374 | 5/1967 | Gawne | 43/112 |
| 4,490,937 | 1/1985 | Yavnieli | 43/112 |
| 4,754,570 | 7/1988 | Bakke | 43/112 |

Primary Examiner—M. Jordan
Attorney, Agent, or Firm—Terry M. Gernstein

[57] ABSTRACT

An insect control assembly is retrofit onto existing streetlights and controls insects by attracting them, and then killing them without the use of pesticides or the like that may be harmful to humans. The assembly disperses a sex attractant and a third-generation pesticide, and also includes an electrified cover that is activated when the streetlight is active. A black light is also used to attract the insects.

5 Claims, 1 Drawing Sheet

INSECT CONTROL ASSEMBLY FOR USE ON STREETLIGHTS

TECHNICAL FILED OF THE INVENTION

The present invention relates to the general art of insect control, and to the particular field of controlling insect pests in an urban environment.

BACKGROUND OF THE INVENTION

It has been estimated that there are as many as 10 insects alive in the world at any instant. While many of these insects are found in forests and other such areas, many are found in areas that are also populated by humans. While insects in many instances are necessary for the continued viability of the environment, they are often considered undesirable pests in areas of common habitation with humans. This is particularly true in urban areas.

Because of this, many cities, municipalities and counties go to great lengths and spend vast amounts of money and time in controlling, or attempting to control, insects in such urban areas. Control of the Gypsy Moth is a prime example of the great lengths to which many urban governments will go. Many governments spend vast amounts of money on airplanes, helicopters, and other aerial spraying devices to spread insecticide that is intended to control insects such as the Gypsy Moth. Special land-based teams are also used in control of this pest. As is well documented, all of this effort and expense is often only minimally effective.

There have been numerous proposals for controlling insects in areas where they are considered as being undesirable pests. These proposals range from the so-called first-generation pesticides: kerosene to coat ponds, arsenate of lead to poison pests that chew, and the like; to second-generation pesticides such as DDT; to third-generation pesticides which include insect hormones that can be made specific and which are not susceptible to insect resistance by evolution.

While pesticides have been effective in certain cases, such as on farms and the like, the have not found extensive use in urban areas for several reasons. First, they have been spread by the above-mentioned aerial spraying techniques which generally are not efficient in urban areas, and, second, some people in urban areas simply do not want such chemicals placed on their property. Such restrictions make aerial spreading of such pesticides in urban areas difficult if not impossible.

Still further, even if sprayed, some pesticides do not last long enough to fully control insects. Repeated rains or the like may dilute or even remove some pesticides. The expensive and onerous spraying operations and programs should thus be repeated on a periodic basis. This repetition is often not carried out because of logistics, cost and the like. Thus, spraying pesticides, even the third-generation pesticides that may not be harmful to humans, in urban areas, presents several problems.

Another problem, is the problem of ensuring contact between the insect and the pesticide. Many insects are quite mobile, and in fact, are more mobile than the sprayed pesticide. Once the pesticide has been deployed, it is generally quite immobile, and insects only contact it through chance encounters. This is not a problem for farmers, or the like who are only interested in protecting specific crop areas from specific pests, but does present a problem to urban residents who are trying to rid a large area of a large variety of pests. Thus, the spraying of urban areas suffers still another drawback.

Accordingly, there is a need for a means and a method for effectively and continuously controlling insects in an urban environment.

OBJECTS OF THE INVENTION

It is a main object of the present invention to provide a means and a method for effectively and continuously controlling insects in an urban environment.

It is another object of the present invention to provide a means and a method for effectively and continuously controlling insects in an urban environment which does not present the dangers; costs, and other drawbacks associated with a spraying operation or spraying programs.

It is another object of the present invention to provide a means and a method for effectively and continuously controlling insects in an urban environment that can be carried out on a continuous basis and can be altered to be specific for various insects, such as the Gypsy Moth, when such insects are in season.

It is another object of the present invention to provide a means and a method for effectively and continuously controlling insects in an urban environment using existing elements and structures whereby costs of the program can be minimized.

It is another object of the present invention to provide a means and a method for effectively and continuously controlling insects in an urban environment which can be controlled to be effective against all pests found in an urban environment, while not harming insects in such environment that are not considered to be pests and without harming humans or other animals in the area affected by the program.

SUMMARY OF THE INVENTION

These, and other, objects are achieved by an insect control program that utilizes street lights as the means for killing pests. The invention includes retrofitting existing streetlights with a device that disperses third-generation pesticides, attracts insets to the pesticide dispersing area, and also includes means for killing such insects at the streetlight.

The inventor has observed the ubiquitousness of streetlights in urban areas. Accordingly, the use of such elements as dispersal points for pesticide provides many advantages, including: low program start-up costs because the expensive dispersing elements are already in place; wide coverage; continuity of environmental appearance; and the like. The costs of chemicals and of retrofitting street lights are more than offset by the cost savings associated with substituting an effective and safe program for the ineffective present programs, as well as the savings in community relations because second-generation pesticides are no longer needed.

Even beyond the safety and convenience features associated with the use of the present invention, the third-generation pesticides are effective, continuous and present little or no threat to humans. Still further, the insects will not build up an immunity to such third-generation pesticides, and thus such program will not have to be modified every few years to account for the evolution of the insects. This, in and of itself, will provide substantial cost savings in the research and development area.

DETAILED DESCRIPTION OF THE PREFERRED EMBODIMENT OF THE INVENTION

Figure 1:
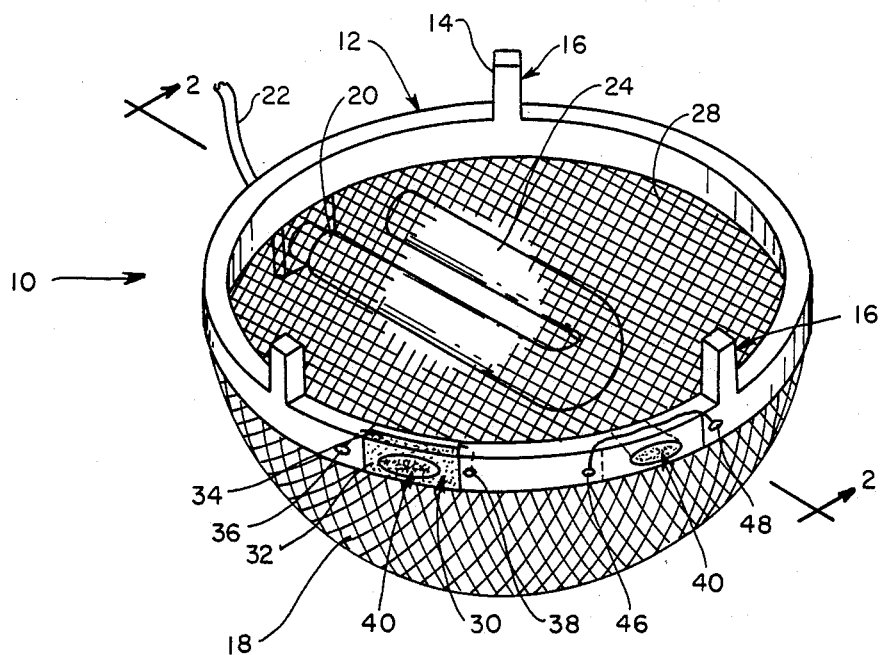
FIG. 1 is a perspective view of a cover unit that is placed over an existing streetlight and which includes means for attracting, killing and controlling insects.
Figure 2:
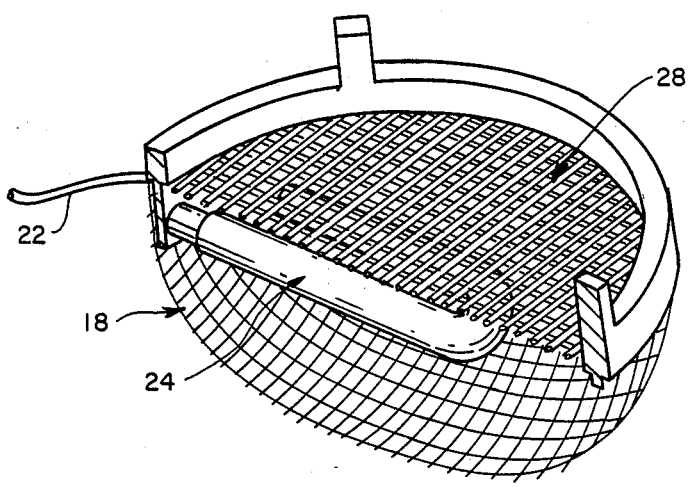
FIG. 2 is a partially cut away perspective view of the cover shown in FIG. 1.

Shown in FIGS. 1 and 2 is a cover assembly 10 that embodies the present invention. The cover assembly 10 is adapted to be placed over an existing street light to replace the cover unit presently on such streetlight. Thus, the cover assembly 10 includes a base unit 12 that is sized and configured to correspond to the size and shape of the existing streetlight. A circular shape is shown for the cover assembly; however, it is understood that other shapes can be used if the existing street lights are rectangular, oval, or the like. The circular shape shown is not intended as being a limitation, but is intended as being merely an example.

The base unit 12 includes means, such as mounting bracket 14, for attaching such unit to the streetlight element. The mounting bracket will be flexible and have a hook, such as hook 16, on a top end thereof to releasably engage the streetlight element. Other suitable attaching means can be used depending on the nature and shape of the existing streetlight.

An electrically conductive cover 18, such as the wire mesh structure shown, is attached to the base unit to cover the streetlight. An electrical junction box 20 is also mounted on the base unit to connect the wire mesh and the other electrical elements of the assembly to the power source of the streetlight to be activated when the streetlight is turned on in its normal manner. The junction box is connected to the source of streetlight Power by a lead, such as lead 22.

Also connected to the junction box is an electrical insect attracting element, such as a black light bulb 24, or the like. Other such elements can also be used as suitable without departing from the scope of the present invention. The lights and other elements will include suitable ballasts, and the like as will occur to those skilled in the art. The particulars of such lights and elements do not form the basis of the present invention, and thus will not be further discussed.

A further mesh cover 28 spans the base unit and can also be electrified if suitable.

Also included in the assembly 10 is an insect attractant means 30. This means includes a wick structure 32 mounted in the base unit and which is fluidically connected to a reservoir 34 which is also mounted i the base unit. A fill tube 36 is connected to the reservoir and a drain tube 38 is also connected to that reservoir. Insect attractant chemicals will be placed in the reservoir and will be dispersed via the wick structure. Various attractant chemicals can be used depending on the type of insects of interest, or a universal type attratant can be used as suitable.

A suitable chemical attractant is a pheromone. A pheromone is a substance that has been found to be exchanged among members of various animal species, and is secreted externally and helps to regulate the animal's environment by influencing other animals. There are several different types of pheromones, such as releasers, primers and the like. There are specific pheromones that are used by insects as sex attractants, and these include chemicals such as qyplure that is a gypsy moth attractant, bombykol, and the like. Pheromones are fully discussed in the scientific literature, such as "The Insects", edited by Thomas Eisner and Edward O. Wilson and published in Scientific American, with a copyright date of 1977, particularly pages 92–101 in an article by Edward O. Wilson dated May 1963 and titled "Pheromones", the disclosure of which is fully incorporated herein by reference.

The attractant will be dispersed by evaporation from the wick element, and will attract insects to the assembly 10. These insects may contact the electrified cover unit, and thus be killed when the light is on.

At other times, such as during daylight hours, when the light is not on, the insects will still be attracted to the light by the attractant. In such situations, they will be treated by third-generation pesticide dispersed by a dispersing means 40 also mounted on the base unit. The third-generation pesticide is specific to insects, and thus will not be harmful to humans or to other animal life that may come into contact with the pesticide. This is one of the advantages of such pesticides, with another advantage being the discovery that insects cannot evolve to be resistant to such pesticides and thus defeat them as was the case with some second-generation pesticides such as DDT. The dispersing means 40 includes a wick element 42 that is fluidically connected to a reservoir 44 that is mounted in the base unit and which includes an inlet 46 and a drain 48. The reservoir can be filled as necessary with the pesticide that is most suitable for use in the particular area and at the particular time of the year, or can be filled with a universal pesticide. The pesticide will be dispersed on a continuous basis and the dispersing means will be operative at all times, both during daylight hours when the streetlight is not active, and during darkness when the streetlight is operating. The pesticide thus works at all times and re-enforces the electrified cover at certain times.

A suitable third generation pesticide is the juvenile hormone. The juvenile hormone has been found to be secreted by all insects at certain stages in their lives. It is used to regulate growth and metamorphosis from larva to pupa to adult. At certain stages, the hormone must be secreted, and at other stages, it must be absent. It has been found, for example, if the hormone is present at certain times, the eggs of such insects will not undergo normal embryonic development. Thus, if the eggs or the insects come into contact with the hormone at certain times, the hormone provokes a lethal derangement of further development and the eggs either will not hatch or the immature insects will die without reproducing.

Other such third-generation pesticides are discussed in the above-mentioned issue of scientific American, at pages 301–305 in an article by Carroll M. Williams dated July 1967 and titled "Third-Generation Pesticides", the disclosure of which is fully incorporate herein by reference.

The use and operation of the assembly is evident from the above disclosure, and thus will not be discussed again.

It is understood that while certain forms of the present invention have been illustrated add described herein, it is not to be limited to the specific forms or arrangements of parts described and shown.

I claim:

1. An insect control assembly for use on street lights comprising:

(A) a base unit which includes a mounting bracket means for releasably securing said base unit to a street light;

(B) an electrically conductive cover mounted on said base unit;

(C) an insect attracting means mounted on said base unit and including (1) an electrical light, and (2) a chemical attractant means;

(D) a third-generation pesticide dispersing means mounted on said base unit.

2. The assembly defined in claim 1 in which said chemical attractant means includes a wick element and disperses a sex attractant.

3. The assembly defined in claim 2 in which said sex attractant includes a pheromone.

4. The assembly defined in claim 3 in which said third-generation pesticide dispersing means includes a wick element and disperses a juvenile hormone.

5. The assembly defined in claim 4 further including a control means that connects said cover unit and said electrical light to the street light to be activated when the street light is activated.

* * * * *